UNITED STATES PATENT OFFICE 2,444,870

COPOLYMERS OF BUTADIENES-1,3 AND ALPHA ARYL ACRYLONITRILES

Albert M. Clifford, Stow, Ohio, assignor to Wingfoot Corporation, Akron, Ohio, a corporation of Delaware No Drawing. Application May 31, 1943,
Serial No. 489,193

6 Claims. (Cl. 260—84.5)

This invention relates to polymerized masses prepared from alpha aromatic acrylonitriles with other monomers and to methods of preparing such copolymers.

The present invention contemplates the provision of new copolymers which are prepared from an alpha aromatic acrylonitrile and other monomers, such as butadiene-1,3. More particularly, it has been found that alpha phenyl acrylonitrile, a compound containing a benzene ring and a cyano group, polymerizes readily with other monomers, such as butadiene-1,3, isoprene, dimethyl butadiene-1,3 and, in general, the conjugated hydrocarbon butadienes, to give plastic masses, some of which have rubber-like properties. Similarly, compounds related to alpha phenyl acrylonitrile, in which the phenyl group in the position alpha to the cyano radical is replaced by other aromatic rings, such as aryl groups and substituted aryl groups, may be reacted with any of the other monomers mentioned to form plastic compositions. Among these may be mentioned the acrylonitriles in which the alpha position to the cyano radical is substituted by phenyl, alkyl phenyl, alkoxy phenyl, or halogen phenyl; specifically, alpha tolyl acrylonitrile, alpha xylyl acrylonitrile, alpha methoxy-phenyl acrylonitrile, alpha ethoxy-phenyl acrylonitrile, and alpha (chlorophenyl) acrylonitrile, particularly the para substituted isomers.

The alpha aromatic acrylonitriles may be prepared by the method set forth in application Serial #344,546, filed July 9, 1940, of which this application is a continuation in part. This application resulted in the grant of U. S. Patent No. 2,362,049, on November 7, 1944. This method consists briefly in treating acetophenone or a homolog or analog of acetophenone, such as chlorophenyl methyl ketone, bromophenyl methyl ketone, anisyl methyl ketone, phenethyl methyl ketone, xylyl methyl ketone, and the like with hydrogen cyanide at a temperature which may be that of the room or somewhat higher or lower to obtain an acetophenone cyanhyrin. Next, an acetate group is introduced into the molecule by means of acetic anhydride, acetyl chloride, ketene, etc., to form the acetate of the acetophenone cyanhydrin, at room temperature or even higher. This acetate is then passed at reduced pressure, say 10 to 12 mm./Hg, through the reaction zone of a furnace at a temperature between about 500° and 600° C. to pyrolyze the compound. The result is an alpha aromatic acrylonitrile, such as alpha phenyl acrylonitrile. The interpolymerization of one of these substituted acrylonitriles with another monmer is effected by customary methods of polymerization, particularly by emulsion polymerization. This is conducted in an aqueous solution containing an emulsifying agent, an oxidant, and a buffer in addition to the monomers. A promoter may also be present. Polymerization takes place at a temperature between about 30° and 80° C., but preferably around 50° C., with the aid of agitation.

To illustrate one method employed, the following example is given, but it will be understood that no limitation is intended thereby.

Example

A mixture of 6.4 grams of alpha phenyl acrylonitrile and 9.6 grams of butadiene-1,3, containing 0.48 gram of $CCl_4$ was emulsified in 20 cc. of an aqueous solution containing 2.5% of Aquarex D (sodium sulphate ester of higher alcohols), 1.33 grams of sodium perborate and a citrate-phosphate buffer providing a final hydrogen-ion concentration of pH 5.2. The emulsion was agitated at a temperature of 50° C. for a period of three days. At the end of that time, the copolymer was precipitated with alcohol and dried.

The conditions of the polymerization just described can be varied, as will be obvious. Other promoters, such as ethylene dichloride, chloro benzene, chloropropionitrile, or chloroform may be substituted for the carbon tetrachloride; the Aquarex D emulsifying agent may be replaced by other emulsifying agents, such as sodium oleate, sodium naphthalene sulfonate and triethanolamine oleate; and oxidizing agents other than sodium perborate may be employed, such as sodium peroxide, hydrogen peroxide, ammonium persulfate, acetyl peroxide, and tertiary butyl hydro peroxide. Of course, other buffers giving other hydrogen-ion concentrations may be used, examples being phosphate-acetate, phosphate-tartrate, tartrate alone, citrates, etc.

The method can be applied to the preparation of any of the copolymers herein indicated, such as alpha phenyl acrylonitrile+butadiene-1,3; alpha phenyl acrylonitrile+isoprene; alpha p-tolyl acrylonitrile+butadiene-1,3; alpha p-methoxy phenyl acrylonitrile+butadiene-1,3; and alpha p-chlorophenyl acrylonitrile+isoprene. Usually each monomer will be present to the extent of at least 20% by weight of the total monomers, but preferably the alpha aromatic acrylonitrile is present to the extent of 40% to 60% of the monomers, and the butadiene compound to the extent of 60% to 40%.

While there has been described above a preferred embodiment of the invention, it will be apparent to those skilled in the art that various modifications and changes may be made therein without departing from the spirit of the invention or the scope of the appended claims.

I claim:

1. A copolymer of a mixture of an alpha aromatic acrylonitrile and a conjugated hydrocarbon butadiene, in which monomer mixture each monmer constitutes at least 20% by weight of the total monomers.

2. A copolymer of a mixture of an an alpha aryl acrylonitrile and a conjugated hydrocarbon butadiene, in which monomer mixture each monomer constitutes at least 20% by weight of the total monomers.

3. A copolymer of about 40% to 60% of alpha phenyl acrylonitrile and about 60% to 40% of butadiene-1,3.

4. A copolymer of a mixture of an alpha aryl acrylonitrile and a hydrocarbon butadiene-1,3 in which monomer mixture each monomer constitutes at least 20% by weight of the total monomers.

5. A copolymer of from 20 to 80 percent of alpha-phenyl-acrylonitrile and from 20 to 80 percent of butadiene-1,3.

6. A copolymer of a mixture of alpha phenyl acrylonitrile and butadiene-1,3, in which monomer mixture each monomer is present in an amount of at least 20%.

ALBERT M. CLIFFORD.

REFERENCES CITED

The following references are of record in the file of this patent:

UNITED STATES PATENTS

| Number | Name | Date |
|---|---|---|
| 1,973,000 | Konrad et al. | Sept. 11, 1934 |
| 2,208,328 | Lichty | July 16, 1940 |
| 2,395,017 | Semon | Feb. 19, 1946 |
| 2,395,474 | Garvey | Feb. 26, 1946 |